Nov. 3, 1964 J. W. HOGAN ETAL 3,155,359

MOUNTING BRACKET FOR MAGNETIC HEADS

Filed Jan. 13, 1964

INVENTORS
JOHN W. HOGAN
FRANK ZEMAN

BY Merchant, Merchant & Gould

ATTORNEYS 3,155,359
Patented Nov. 3, 1964

3,155,359
MOUNTING BRACKET FOR MAGNETIC HEADS

John W. Hogan and Frank Zeman, Minneapolis, Minn., assignors to The Nortronics Company, Inc., Minneapolis, Minn., a corporation of Minnesota Filed Jan. 13, 1964, Ser. No. 337,449
8 Claims. (Cl. 248—288)

This invention relates generally to equipment and apparatus for electromagnetic tape handling machines, and more particularly it relates to a novel mounting bracket for electromagnetic transducer heads.

Generally, the present invention comprises a bracket for mounting an electromagnetic transducer head on a tape handling machine relative to a path of tape travel, the bracket including a plate member secured to the machine, a base member to carry the transducer head, adjustment screws securing the base member to the plate member with the front portion thereof extending toward the tape path, and a lock element for holding the position of the base member relative to the plate member.

An important object of the present invention is the provision of a bracket for mounting an electromagnetic transducer head in which the adjustment screws and means thereof are particularly arranged and located to provide for a generally exact, convenient and generally permanent adjustment of the desired position of the transducer head relative to the path of tape travel.

It is well known that the alignment of electromagnetic transducer heads relative to a path of tape travel is very important, particularly the azimuth alignment of the heads. For example, the reproducing or play back head must be generally exactly aligned with the track on the recording medium (tape), so that the gap is generally perfectly aligned with the signals as placed by the recording head. If the reproducing or play back head is misaligned, there will be a considerable reduction in the signal level produced. In view of these considerations, another important object of the present invention is the provision of a bracket for mounting an electromagnetic transducer head which provides for an adjustment of the head about an axis generally perpendicular to the tape path (azimuth adjustment), and which also provides for adjustment of the head about an axis generally parallel to the tape path.

Another object of the present invention is the provision of a bracket for mounting an electromagnetic transducer head on a tape handling machine which includes a locking element for positively securing the head in its previously adjusted position relative to the tape path.

A further object of the present invention is the provision of a bracket for mounting a transducer head which is particularly designed and constructed so that the head is offset from the adjustment screws whereby the adjustment screws are exposed and readily available for adjustment without moving or even touching the transducer head.

Other objects of the present invention reside in the provision of a bracket for mounting transducer heads which is designed for economy of manufacture, convenience and simplicity in its operation and durability throughout long periods of continued use.

The above and still further objects and advantages of the present invention will become apparent from a consideration of the following detailed specification, appended claims and attached drawings.

Referring to the drawings, wherein like reference characters indicate like parts or elements throughout the several views.

Figure 1:
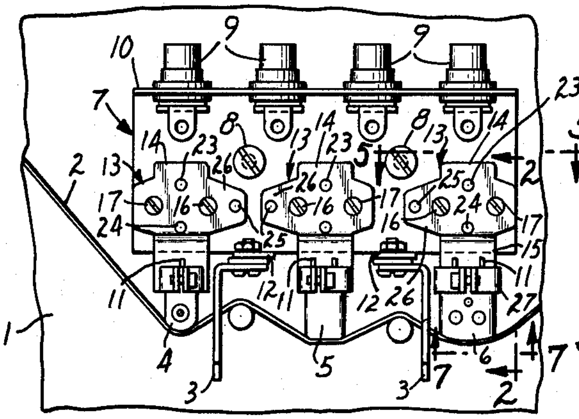
FIG. 1 is a plan view of a tape handling machine showing the novel transducer head mounting bracket of the present invention.

Referring more particularly to FIG. 1, the tape deck 1 of a tape handling machine is shown therein, along with a section of tape 2 suitably guided along a path of tape travel. A pair of tape guide arms 3 are shown in the drawings, and it will be understood that additional tape guiding means is ordinarily provided for moving the tape 2 in its desired path across and around the electromagnetic transducer heads, noted hereinafter. It will be understood that the usual tape handling machine further includes tape transport mechanism for moving the tape in its path across the heads, such as for example a power driven capstan, an idle pressure roller or puck, and suitable mechanism for operating the same, none of which is shown herein. The tape 2 is normally stored or wound upon a suitable reel, not shown, which may also be power driven in some instances.

In the usual tape handling machine, one or more electromagnetic transducer heads are provided, and as used herein, the term "head" includes generally any type of transducer head, such as for example, an erase head 4, a recording head 5, and a reproducing head 6 (referring to FIG. 1). The reproducing head 6 is normally referred to as a play back head in audio practice, and as a reading head in computer practice. In operation, the recording head 5 converts electric currents into magnetic fields which magnetize the medium (tape) and thereby record the signal pattern, this process being reversed with the play back head 6, and the erase head 4 removes the signal pattern from the tape so as to make it ready to accept a new set of recorded signals.

Figure 7:
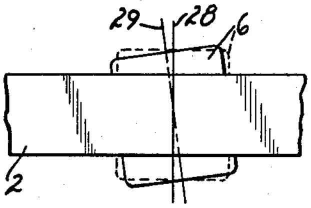
FIG. 7 is an enlarged view in section taken on the line 7—7 of FIG. 1 and illustrating the azimuth adjustment of the head and bracket, an alternative position being shown by dotted lines.

The plurality of transducer heads 4–6 are illustrated only for the purpose of describing the novel mounting bracket means of the present invention, it being noted that this invention applies with equal significance to the mounting of a single head. It is important in the magnetic recording practice to have the transducer heads generally perfectly aligned with the track on the tape 2, and therefore it is important to have a mounting bracket for the head which permits a generally perfect adjustment of the same to the desired position. For example, it is important that the reproducing or play back head be generally exactly aligned with the track on the tape so that the gap is generally perfectly aligned with the signals placed by the recording head. Referring to the azimuth alignment or misalignment as illustrated in FIG. 7 of the drawings, it is known that a misalignment of a play back head 6 of only a few minutes will result in a loss in the reproduced signal of several decibels.

The adjustable head mounting bracket of the present invention comprises a plate member, represented generally by the reference numeral 7, rigidly secured by suitable screws 8 to the tape deck 1 on one side of the path of tape travel represented by the section of tape 2. A plurality of pin jacks 9 are mounted on an upstanding rear flange 10 of the plate member 7, the pin jacks 9 being adapted for electrical connection by suitable lead wires, not shown, to the terminal pins 11 of the transducer heads 4–6, the terminal pins 11 being also connected to the windings, not shown, of the heads 4–6. The front portion of the plate member 7 defines a pair of laterally spaced upstanding tabs 12 onto which are mounted the guide arms 3, as shown particularly in FIG. 1.

Figure 2:
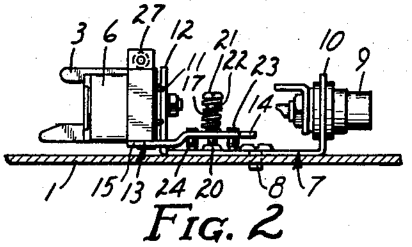
FIG. 2 is a view in section taken on the line 2—2 of FIG. 1.

The mounting bracket means for the present invention further comprises a base member, represented generally by the reference numeral 13, adapted to carry the transducer head. Although three of the base members 13 are shown in FIG. 1, a further detailed description of only one thereof will be given, the same being the base member which carries the play back head 6. The base member 13 comprises a rear portion 14 and a front portion 15, and adjustment means is provided for securing the rear portion 14 thereof to the plate member 7 in a general position with the front portion 15 extending generally toward the path of the tape section 2. The above-noted adjustment means provides an adjustment for the position of the transducer head 6 by adjusting the position of the base member 13 relative to the plate member 7. As shown particularly in FIG. 2, the base member 13 is formed with the rear portion 14 thereof elevated slightly with respect to the front portion 15, the planes of both thereof being generally parallel.

The adjustment means noted above comprises a pair of threaded cap screws 16, 17, sometimes referred to herein as retention screws or retention elements. The cap screw 16 slidably extends through an aperture defined in the base member 13 and is also screw threaded into an aligned threaded aperture defined by a raised boss 18 on the plate member 7. The head 19 of the cap screw 16 is disposed in engagement with the upper surface of the base member 13. The retention screw 17 is laterally spaced from the retention screw 16 and also slidably extends through an aperture defined in the base member 13 and is screw threaded into an aligned threaded aperture defined by a boss 20 in the plate member 7. The retention screw 17 is somewhat longer than the screw 16 and is disposed with its head 21 in spaced relation above the upper surface of the base member 13, and a coiled compression spring 22 is received to define the shank of the screw 17 and is interposed between the head 21 thereof and the base member 13, as shown particularly in the drawings. The spring 22 is sometimes referred to herein broadly as yielding means and denoted as a part of the broader term retention element (including the cap screw 16). The cap screw 16 restricts movement of the base member 13 in a direction away from the plate member 7, and the spring 22 on the screw 17 acts to bias the adjacent portion of the base member toward the plate member 7. The retention screws 16, 17 and their corresponding threaded apertures in the plate member 7 are located on the line extending generally parallel to the path of tape travel, and the retention screws 16, 17 also serve to prevent any significant rotation of the base member 13 and its associated head 6 about a vertical axis (an axis perpendicular to the plate member 7).

Figure 3:
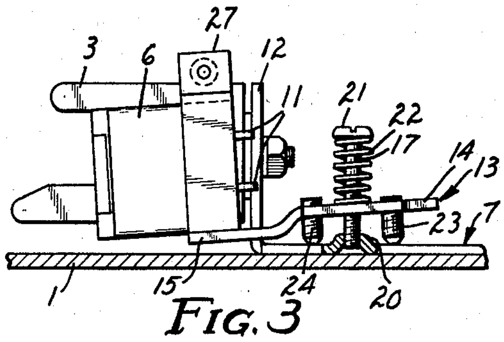
FIG. 3 is an enlarged view of a portion of FIG. 2 showing a misaligned position of the transducer head and mounting bracket requiring adjustment.
Figure 4:
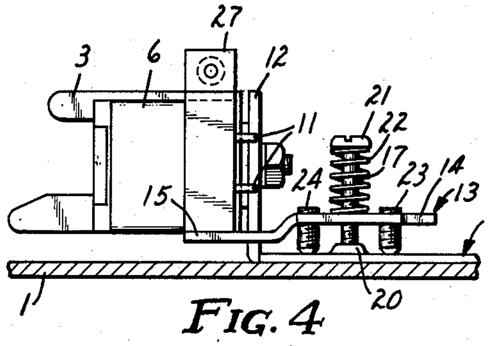
FIG. 4 is a view corresponding to FIG. 3 but showing the adjusted position of the head and mounting bracket.

Another pair of screws, referred to herein as adjustment screws 23, 24, are also provided, the same being threaded into spaced threaded apertures in the base member 13, as shown particularly in FIGS. 1, 3 and 4. Referring to FIG. 1, it will be noted that the adjustment screws 23, 24 are disposed on a line which is generally perpendicular to a line extending through the retention elements or retention screws 16, 17; and the adjustment screw 24 is disposed on the forward side of a line extending through the retention screws 16, 17 and the adjustment screw 23 is disposed on the rearward side of a line extending through the retention screws 16, 17. The adjustment screws 23, 24 engage the plate member 7 and are rotatable in the base member 13 for adjusting the position of the base member 13 relative to the plate member 7 and also relative to a fulcrum defined by the retention screws 16, 17.

According to the present invention, the retention screws 16, 17 may be threaded in and out of their threaded apertures in the bosses 18, 20 of the plate member 7 for adjusting the position of the base member 13 relative to the plate member 7 and also relative to a fulcrum defined by the end portions of the adjustment screws 23, 24.

An important feature of the present invention is the provision of a lock element or lock screw 25 threaded into an aperture defined in a lateral flange 26 of the base member rear portion 14, the lower end portion of the lock screw 25 being adapted to engage the adjacent surface of the plate member 7 for holding the previously adjusted position of the base member 13 relative thereto.

An important feature of the present invention is the construction of the base member 13 with the front portion 15 thereof offset from the rear portion 14 in spaced relation to all of the screws 16, 17, 23–25 of the rear portion 14 so as to provide for the exposure and ready access to the same for adjustment purposes. As shown in the drawings, the front portion 15 of the base member 13 is provided with adjustable clamp elements 27 for rigidly but adjustably securing the transducer head 6 onto the base member 13. The clamp elements 27 permit adjustment of the head 6 with respect to the section of tape 2, but the transducer head 6 is positioned sufficiently forward of the base member rear portion 14 to not interfere with adjustment of the screws.

Figure 5:
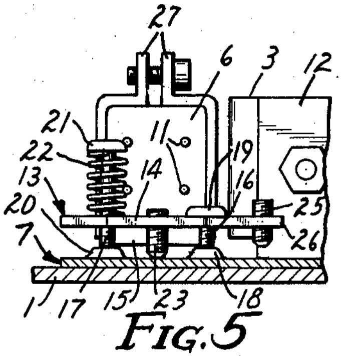
FIG. 5 is an enlarged view in section taken on the line 5—5 of FIG. 1 and showing the mounting bracket in a position ready for adjustment.

Referring to the adjustment of the base member 13 and the transducer head 6 carried thereby about an axis generally perpendicular to the tape path or surface of the tape 2 (azimuth adjustment), FIG. 5 shows the released position of the lock screw 25 permitting adjustment of the retention elements 16, 17. Assuming the azimuth misalignment of the head 6 represented by the full lines in FIG. 7, it would be desirable to adjust the position of the head 6 by use of the retention screws 16, 17 so as to move the position of the head 6 to the dotted line position. In FIG. 7, line 28 represents the alignment of the signal track or pattern on the tape 2, and the broken line 29 represents the gap center line when the head 6 is in its misaligned full line position. To correct the situation represented by FIG. 7, it would be necessary to screw in or screw down the retention screw 17 and screw out the retention screw 16 so as to pivot or adjust the base member 13 (and the head 6) about a fulcrum defined by the adjustment screws 23, 24.

Figure 6:
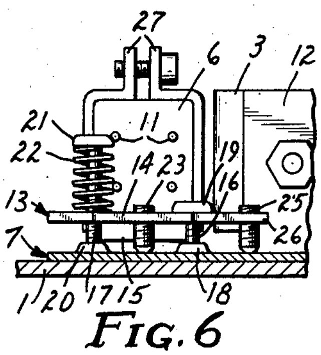
FIG. 6 is a view similar to FIG. 5 but showing the mounting bracket in a locked position.

Assuming misalignment of the base member 13 and the head 6 about an axis generally parallel to the path of tape travel, as represented by FIG. 3, it would be necessary to loosen or screw out the adjustment screw 23 and tighten or screw in the adjustment screw 24 to pivot the base member 13 (and the head 6) about a fulcrum defined by the retention screws 16, 17 so as to bring the base member 13 to the desired position, as for example the position shown in FIG. 4. After the desired adjustments to the base member 13 have been accomplished, the same may be locked in its desired position with respect to the plate member 7 by means of the lock screw 25, the locked position being shown in FIG. 6.

This invention has been thoroughly tested and found to be completely satisfactory for the accomplishment of the above-noted objects; and while a preferred embodiment thereof in which the principles of the present invention have been incorporated has been shown and described above, it should be specifically understood that the same may be modified without departure from the scope and spirit of the appended claims.

What I claim is:

1. A bracket for mounting an electromagnetic transducer head on a tape handling machine relative to a path of tape travel, said bracket comprising:

(*a*) a plate member adapted to be secured to said machine on one side of said tape path, (*b*) a base member adapted to carry said transducer head and having a rear portion and a front portion, (*c*) adjustment means securing the rear portion of said base member to said plate member in a general position with the front thereof extending generally toward said tape path, said adjustment means providing an adjustment for the position of said transducer head by adjusting the position of the base member relative to the plate member, said means comprising:

(1) a pair of retention elements slidably extending through spaced apertures in said base member and secured to said plate member, one of said retention elements restricting movement of said base member in a direction away from said plate member, and the other of said retention elements including yielding means biasing said base member in a direction toward said plate member, (2) a pair of spaced adjustment screws threaded into spaced apertures in said base member and disposed on a line which is generally perpendicular to a line extending through said retention elements, said adjustment screws engaging said plate member and being rotatable in the base member for adjusting the position of the base member relative to the plate member and also relative to the fulcrum defined by said retention elements, (3) said retention elements being adjustable relative to the plate member for changing the position of the base member relative to the plate member and also relative to a fulcrum defined by said adjustment screws, and (*d*) a lock element for holding the position of said base member relative to the plate member.

2. The structure defined in claim 1 in which the front portion of said base member is offset from said rear portion thereof and in which a transducer head is adapted to be carried by said front portion in spaced relation to the adjustment means of said rear portion.

3. The structure defined in claim 1 in further combination with adjustable clamping means provided on said front portion of said base member and adapted for the adjustable mounting of said transducer head on said base member.

4. A bracket for mounting an electromagnetic transducer head on a tape handling machine relative to a path of tape travel, said bracket comprising:

(*a*) a plate member adapted to be secured to said machine on one side of said tape path, (*b*) a base member adapted to carry said transducer head and having a rear portion and a front portion, (*c*) adjustment means securing the rear portion of said base member to said plate member in a general position with the front portion thereof extending generally toward said tape path, said adjustment means providing an adjustment for the position of said transducer head by adjusting the position of said base member relative to the plate member, said means comprising:

(1) a pair of threaded retention screws slidably extending through spaced apertures in said base member and said retention screws also being threaded into spaced apertures defined in said plate member and generally aligned with the corresponding apertures in said base member, said retention screws restricting movement of said base member in a direction away from said plate member, (2) a pair of spaced adjustment screws threaded into spaced apertures in said base member, said adjustment screws benig disposed on a line which is generally perpendicular to a line extending through said retention screws, said adjustment screws engaging said plate member and being rotatable in the base member for adjusting the position of the base member relative to the plate member and also relative to a fulcrum defined by said retention screws, (3) said retention screws being rotatable in the plate member for adjusting the position of the base member relative to the plate member and also relative to a fulcrum defined by said adjustment screws, and (*d*) a lock screw threaded into said base member and engaging said plate member for holding the position of said base member relative thereto.

5. A bracket for mounting an electromagnetic transducer head on a tape handling machine relative to a path of tape travel, said bracket comprising:

(*a*) a plate member adapted to be secured to said machine on one side of said tape path, (*b*) a base member adapted to carry said transducer head and having a rear portion and a front portion, (*c*) adjustment means securing the rear portion of said base member to said plate member in a general position with the front portion thereof extending generally toward said tape path, said adjustment means providing an adjustment for the position of said transducer head by adjusting the position of said base member relative to the plate member, said means comprising:

(1) a pair of threaded retention screws slidably extending through spaced apertures in said base member and said retention screws also being threaded into spaced apertures defined in said plate member and generally aligned with the corresponding apertures in said base member, said retention screws restricting movement of said base member in a direction away from said plate member, (2) a pair of adjustment screws threaded into spaced apertures in said base member one of which is disposed on one side of a line through said retention screws and the other of which is disposed on the other side of a line through said retention screws, said adjustment screws engaging said plate member and being rotatable in the base member for adjusting the position of the base member relative to the plate member and also relative to a fulcrum defined by said retention screws, (3) said retention screws being rotatable in the plate member for adjusting the position of the base member relative to the plate member and also relative to a fulcrum defined by said adjustment screws, and (*d*) a lock screw threaded into said base member and engaging said plate member for holding the position of said base member relative thereto.

6. A bracket for mounting an electromagnetic transducer head on a tape handling machine relative to a path of tape travel, said bracket comprising:

(*a*) a plate member adapted to be secured to said machine on one side of said tape path, (*b*) a base member adapted to carry said transducer head, (*c*) adjustment means securing said base member to said plate member, said adjustment means providing an adjustment for the position of said transducer head by adjusting the position of the base member relative to the plate member, said means comprising:

(1) a pair of retention elements slidably extending through spaced apertures in said base member and secured to said plate member, one of said retention elements restricting movement of said base member in a direction away from said plate member, and the other of said retention elements including yielding means biasing said base member in a direction toward said plate member, (2) a pair of spaced adjustment screws threaded into spaced apertures in said base member and disposed on a line which is generally perpendicular to a line extending through said retention elements, said adjustment screws engaging said plate member and being rotatable in the base member for adjusting the position of the base member relative to the plate member and also relative to the fulcrum defined by said retention elements, (3) said retention elements being adjustable relative to the plate member for changing the position of the base member relative to the plate member and also relative to the fulcrum defined by said adjustment screws, and (*d*) a lock element for holding the position of said base member relative to the plate member.

7. The structure defined in claim 6 in which said lock element is offset laterally from said retention elements and said adjustment screws.

8. A bracket for mounting an electromagnetic transducer head on a tape handling machine relative to a path of tape travel, said bracket comprising:

(*a*) a plate member adapted to be secured to said machine on one side of said tape path, (b) a base member adapted to carry said transducer head and having a rear portion and a front portion, (*c*) adjustment means securing the rear portion of said base member to said plate member in a general position with the front thereof extending generally toward said tape path, said adjustment means providing an adjustment for the position of said transducer head by adjusting the position of the base member relative to the plate member, said means comprising:

(1) a pair of retention elements slidably extending through spaced apertures in said base member and secured to said plate member, one of said retention elements restricting movement of said base member in a direction away from said plate member, and the other of said retention elements including yielding means biasing said base member in a direction toward said plate member, (2) a pair of spaced adjustment screws threaded into spaced apertures in said base member and disposed on a line which is generally perpendicular to a line extending through said retention elements, said adjustment screws engaging said plate member and being rotatable in the base member for adjusting the position of the base member relative to the plate member and also relative to the fulcrum defined by said retention elements, (3) said retention elements being adjustable relative to the plate member for changing the position of the base member relative to the plate member and also relative to a fulcrum defined by said adjustment screws, and (*d*) the front portion of said base member being offset from said rear portion thereof and said transducer head being carried by said front portion in spaced relation to the adjustment means of said rear portion of the base member.

References Cited in the file of this patent

UNITED STATES PATENTS 2,644,856 Pettus ---------- July 7, 1953
2,864,892 Perkins ---------- Dec. 16, 1958
2,905,933 Canepa ---------- Sept. 22, 1959
3,060,277 Baker et al. ---------- Oct. 23, 1962

FOREIGN PATENTS 888,734 Great Britain ---------- Feb. 7, 1962
1,042,255 Germany ---------- Oct. 30, 1958